United States Patent [19]

Yamazaki et al.

[11] Patent Number: 4,655,541

[45] Date of Patent: Apr. 7, 1987

[54] HOLOGRAM SCANNER

[75] Inventors: Kozo Yamazaki, Zama; Fumio Yamagishi, Ebina; Hiroyuki Ikeda, Yokohama; Takefumi Inagaki, Kawasaki; Ichiro Sebata, Tokyo; Shunji Kitagawa, Atsugi; Masayuki Kato, Atsugi; Toshiyuki Ichikawa, Atsugi, all of Japan

[73] Assignee: Fujitsu Limited, Kanagawa, Japan

[21] Appl. No.: 675,870

[22] Filed: Nov. 28, 1984

[30] Foreign Application Priority Data

| Nov. 30, 1983 | [JP] | Japan | 58-224325 |
| May 11, 1984 | [JP] | Japan | 59-092979 |
| May 11, 1984 | [JP] | Japan | 59-092978 |
| May 29, 1984 | [JP] | Japan | 59-107402 |
| May 29, 1984 | [JP] | Japan | 59-107385 |
| Jul. 30, 1984 | [JP] | Japan | 59-157194 |
| Jul. 30, 1984 | [JP] | Japan | 59-157195 |
| Jul. 31, 1984 | [JP] | Japan | 59-158691 |

[51] Int. Cl.$^4$ ............... G02B 26/10; G02B 26/08

[52] U.S. Cl. ............... 350/3.71; 350/6.2

[58] Field of Search ............... 350/3.71, 6.2

[56] References Cited

U.S. PATENT DOCUMENTS

| 4,165,464 | 8/1979 | Ikeda et al. | 350/3.71 |
| 4,239,326 | 12/1980 | Kramer | 350/3.71 |

Primary Examiner—Bruce Y. Arnold
Assistant Examiner—David J. Edmondson
Attorney, Agent, or Firm—Staas & Halsey

[57] ABSTRACT

A hologram scanner includes a laser source, a rotary body having a rotational axis at least one hologram facet arranged on the rotary body for diffracting a laser beam from the laser source to scan an object and receive the scattered light from the object for detection thereof, a motor means for driving the rotary body, and an optical detector for detecting the scattered light received and diffracted by the hologram facet. The hologram facet is inclined with respect to the rotational axis of the rotary body.

24 Claims, 35 Drawing Figures

HOLOGRAM SCANNER

BACKGROUND OF THE INVENTION

The present invention relates to a hologram scanner which scans an object by using a laser beam diffracted by a hologram.

A bar-code reader is used in a market control system in a supermarket or the like. Such a bar-code reader reads a bar-code printed on a commodity and inputs the information data to a computer to control the operation of the supermarket. A hologram scanner is used as a bar-code scanner of the bar-code reader.

FIG. 1 is a view of a hologram scanner used as a bar-code reader according to the prior art. The scanner comprises a laser source 2, a beam expander 3, a hologram disc 4 comprising a plurality of hologram facet elements, a motor 5 for driving the hologram disc 4, a mirror 9 having a throughhole 9a at the center thereof for passing a laser beam, a condensor lens 10, and an optical detector 11, within an outer box 1. A laser beam from the laser source 2 passes through the throughhole 9a of the mirror 9 and is diffracted by a rotating hologram disc 4 so that the laser beam scans a bar-code 12 printed on a commodity 13, as a scanning beam 7 through a window 6. The laser beam 7 irradiated onto the bar-code 12 is scattered and a part 8 of the scattered light returns toward the hologram disc 4. The scattered light 8 is diffracted by the hologram 4, reflected by the mirror 9, and detected by the detector 11 through the lens 10.

Each component, such as the laser source 2, the hologram disc 4, the motor 5, the mirror 9; and the detector 11, of the hologram scanner is individually attached to the outer box 1 of the bar-code reader, together with the other components such as a control circuit, an interface unit and a power source. Such a structure is not compact and is inconvenient to handle, which causes difficulties when assembling the bar-code reader since the positioning of the parts of the hologram scanner is not easy.

The hologram disc 4 of the prior art scanner comprises a disc plate located perpendicularly to the rotational axis thereof. Therefore, the diffraction angle $\theta$ (FIG. 2) of the scanning beam 7 must be large for elongating the scanning line traced by the scanning point A with respect to the rotational angle of the hologram disc 4. However, if the diffraction angle $\theta$ is enlarged, the amount of the scattered light 8 received by the hologram disc 4 decreases, which results in the degradation of the reliability of the detection.

The reading ability of the scanner is upgraded as the laser beam is strengthened. However, the eyes of the operator or customer may be damaged if the laser beam is excessively strengthened. The laser beam strength must not exceed the safety standards for the human eye. The prior art method for enhancing the allowable laser beam strength in accordance with the safety standards is illustrated in FIG. 3. The laser beam for scanning in one direction is divided into two beams which are separated from each other by more than 7 mm at the outside of the scanning window 50' (d<7 mm), by using hologram facets having slightly different diffraction angles. The two separated beams (dash line and solid line) scan in the same direction, e.g., in the direction perpendicular to the drawing sheet. By using two separated beams in one scanning direction, the strength of each of the beams can be enhanced, even if they continuously scan one after the other in the same direction, since they are deemed to be independent of each other. However, in such an arrangement, the width of the window 50' formed in the cover plate 49' disposed over the glass plate 48' must be enlarged to allow the passage of the two separated beams, which can lead to accidental damage of the glass plate by the article to be scanned above the window 50'.

SUMMARY OF THE INVENTION

A primary object of the present invention is to provide a hologram scanner which makes it possible to scan perpendicularly to the rotational axis of the hologram and to effectively receive the scattered light, and which allows the scanner to be compact.

Another object of the present invention is to provide a hologram scanner which makes it possible to enhance the safety level of the beam strength of each scanning beam as much as possible, without enlarging the width of the scanning window through which the scanning beam passes.

The above-mentioned primary object is achieved by a hologram scanner comprising: a laser source; a rotary body having a rotational axis; at least one hologram facet arranged on the rotary body for diffracting a laser beam from the laser source to scan an objective and to receive the scattered light from the objective for detection thereof; a motor means for driving the rotary body; and an optical detector for detecting the scattered light received and diffracted by the hologram facet; wherein the hologram facet is inclined with respect to the rotational axis of the rotary body.

Another object is achieved by various embodiments of the present invention as well as further objects, as can be understood from the description with reference to the accompanying drawings.

DESCRIPTION OF THE PREFERRED EMBODIMENTS

Figure 4:
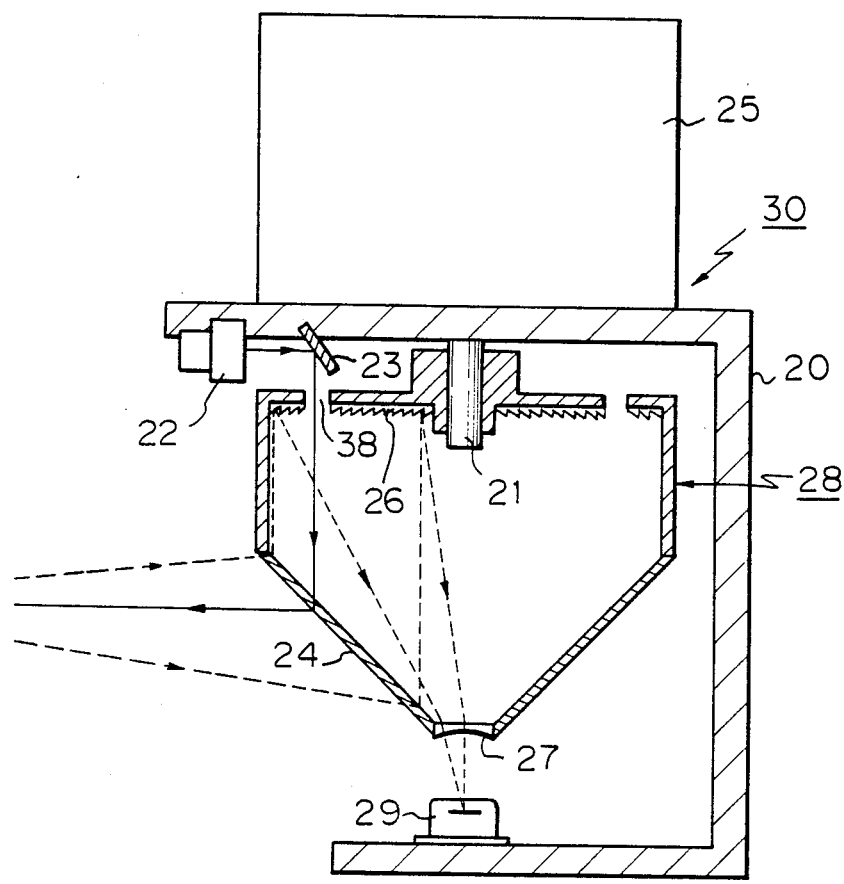
FIG. 4 indicates the construction of a hologram scanner in accordance with the present invention.

An embodiment of the present invention is illustrated in FIG. 4. A motor 25 is secured on a frame 20. A rotary body 28 is attached to a rotary shaft 21 of the motor 25. The rotary body 28 comprises at least one hologram facet 24 on which a hologram (not shown) is constructed. The hologram facet 24 is inclined with respect to the rotary shaft 21. A Fresnel mirror 26 is disposed on the upper inner surface of the rotary body 28 to reflect and converge a parallel beam. A metallic reflection film (not shown) is coated on the front surface or the rear surface (facing the upper inner surface of the rotary body 28) of the Fresnel mirror 26.

Figure 5:
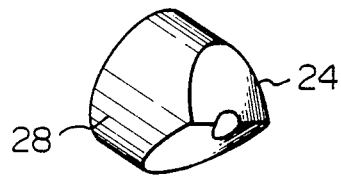
FIGS. 5 to 9 are perspective views of different examples of the rotary body of the hologram scanner in accordance with the present invention.
Figure 6:
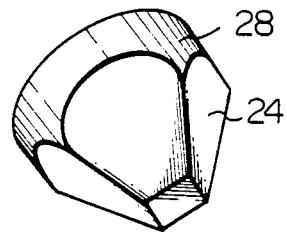
Figure 7:
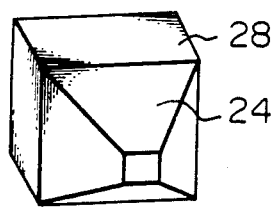
Figure 8:
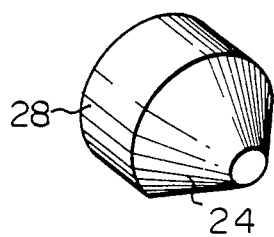
Figure 9:
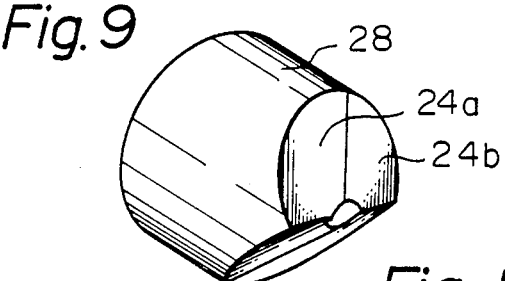

The rotating body 28 has the shape illustrated in FIG. 5. Two hologram facets 24 form a wedge at an end of a cylindrical body. Variations of the rotary body 28 are illustrated in FIGS. 6 to 9. The rotary body 28 of FIG. 6 comprises four hologram facets 24 forming a quadrangular pyramid at an end of a cylindrical body. The rotary body 28 of FIG. 7 comprises four hologram facets 24 forming a quadrangular pyramid at an end of a square pillar. The rotary body 28 of FIG. 8 comprises a conical facet 24 at an end of a cylindrical body. Two hologram facet elements 24a and 24b having different diffraction angles may be formed on the same plane, as illustrated in FIG. 9. The number of hologram facets may be three, four, five, or more to form a pyramid. Each hologram facet 24 diffracts a scanning beam to irradiate an object and simultaneously receives scattered light from the object for the detection thereof. Therefore, each hologram facet 24 must be large enough to receive a critical amount of the scattered light to be able to recognize the object. Taking this point into consideration, the rotary body 28 comprising two hologram facets 24 illustrated in FIG. 5 is the most preferable from the standpoint of compactness and productivity.

A laser diode module 22 which emits a plane wave laser beam having an predetermined diameter and a mirror 23 for reflecting the laser beam are secured to the frame 20 (FIG. 4). An optical detector 29 is also secured to the frame 20 at the position facing the lower end of the rotary body 28. A concave lens 27 is installed at the lower end of the rotary body 28 for the following reason. The scattered light (dash lines) from the object is converged toward the center of the lower end of the rotary body 28 by the function of the Fresnel mirror 26. It is desirable to make the converging area at the lower end of the rotary body 28 as small as possible to enlarge the hologram facet area. The optical detector 29 for detecting the converged beam is disposed at a distance below the lower end of the rotary body in such a manner that the detector does not come in contact with the rotary body. Therefore, the concave lens 27 is needed to elongate the focus position from the proximity of the rotary body end to the optical detector 29.

Figure 10:
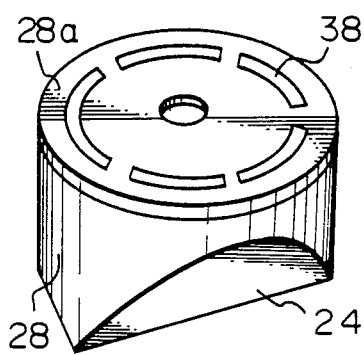
FIGS. 10 and 11 are upper views of different examples of the rotary body of the hologram scanner in accordance with the present invention.

The upper plate 28a (FIG. 10) of the rotary body 28 has a plurality of slits 38 in a circle to pass the laser beam therethrough.

Figure 11:
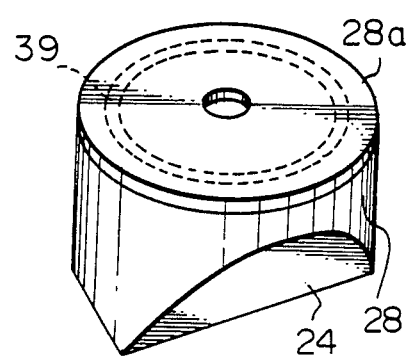

Another arrangement for passing the laser beam through the upper plate 28a of the rotary body 28 is illustrated in FIG. 11. In this arrangement, the upper plate 28a is made of a transparent material and the metallic reflection film is not coated along a circular track 39 on the front surface or the rear surface of the Fresnel lens 26 (FIG. 4) to pass the laser beam through the circular track 39. The track 39 is not embossed to form the Fresnel lens so that the beam passes straight therethrough. By this arrangement, the rotary body 28 can be securely sealed, which stabilizes the function of the hologram.

Figure 12:
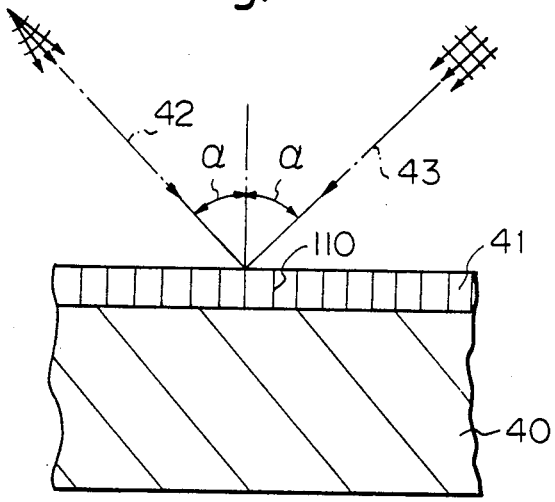
FIG. 12 is an explanatory view of the hologram construction method in accordance with the present invention.

A desirable method for constructing a hologram used in the hologram scanner of the present invention is illustrated in FIG. 12. A plane wave beam 43 and a spherical wave beam 42 are irradiated at the same incidence angle $\alpha$ upon the photosensitive emulsion 41 coated on a transparent substrate such as a glass plate 40. The beams 42 and 43 interfere with each other and form interference fringes 110 in the photosensitive emulsion 41. The Bragg plane of the interference fringes 110 formed by such a method is perpendicular to the substrate surface. Therefore, the Bragg angle does not change, irrespective of any change in the thickness of the emulsion during the chemical treatment such as developing and fixing the emulsion, which results in a high diffraction efficiency at the time of the reconstruction of the beam through the hologram.

It is desirable that the incidence angle $\alpha$ be 45 degrees, since a laser beam irradiated vertically along the rotational axis can be diffracted in the horizontal direction, by inclining the hologram at an angle of 45 degrees with respect to the vertical rotational axis, which makes it possible to achieve an effective scanning without decreasing the amount of the scattered light received by the hologram.

Figure 13:
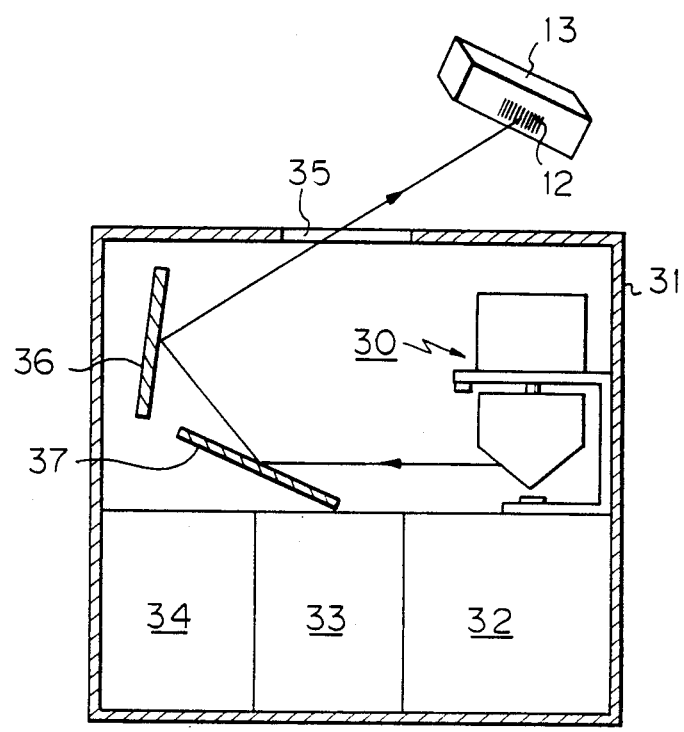
FIG. 13 indicates the construction of a bar-code reader using the hologram scanner in accordance with the present invention.

The hologram scanner of FIG. 4 constitutes a scanning unit 30 formed in one module combining the laser source 22, the rotary body 28, the optical detector 29, the mirror 23, and the motor 25, on the frame 20. Such a scanning unit module 30 is installed in a bar-code reader, for example, as illustrated in FIG. 13. The scanning unit 30 is installed within an outer frame 31 together with a drive control means 32, an interface means 33 for communicating with a central processing unit, and a power source 34. The laser beam emitted from the scanning unit 30 is reflected by mirrors 36 and 37 and passes and scans a bar-code 12 of a commodity 13 through a window 35.

As mentioned above, each hologram facet of the hologram scanner of the present invention is inclined with respect to the rotational axis of the rotary body. Therefore, it is possible to scan in the direction perpendicular to the rotational axis of the rotary body, which increases the efficiency of scanning, since the scanning range with respect to the rotational angle of the rotary body is widened, and which also makes it possible to use a small hologram facet since the scattered light can be effectively received, thus obtaining a compact scanner.

Also, the components of the hologram scanner are united in a body as one module. The module performs a complete scanning function by itself as one system, from emission of the laser beam to detection of the scattered light, and the mechanical accuracy is guaranteed by the module. Therefore, various reading devices are easily assembled by using such a scanning module, which reduces the total cost of producing the device. Assembling the hologram scanner as one compact module with a high mechanical accuracy is more easily achieved than assembling the components of the scanner individually at the time of fabricating the reading device in which the scanner is installed.

Also, by using such a compact scanning module, the reading device becomes small.

Other examples of the rotary body 28 of the hologram scanner in accordance with the present invention are illustrated in FIGS. 14 to 20. These examples are featured in that they comprise a means for changing the incidence point of the laser beam on the hologram facet in such a manner that the passage of the beam diffracted by the hologram facet is changed.

Figure 1:
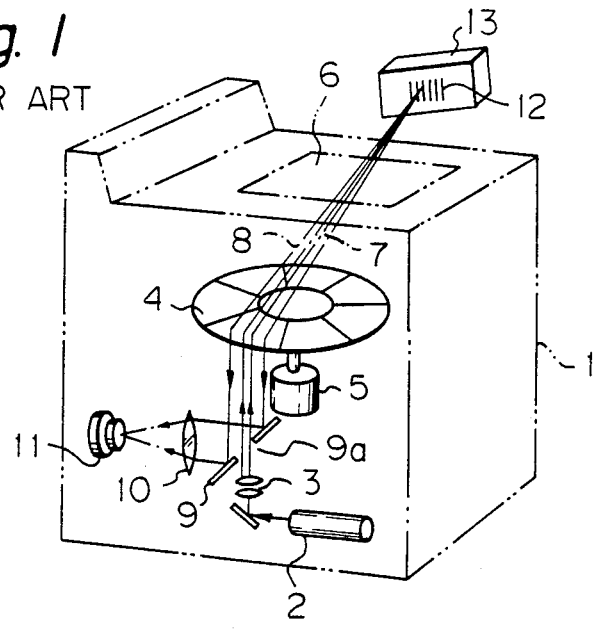
FIG. 1 indicates the construction of a hologram scanner in accordance with the prior art.
Figure 2:
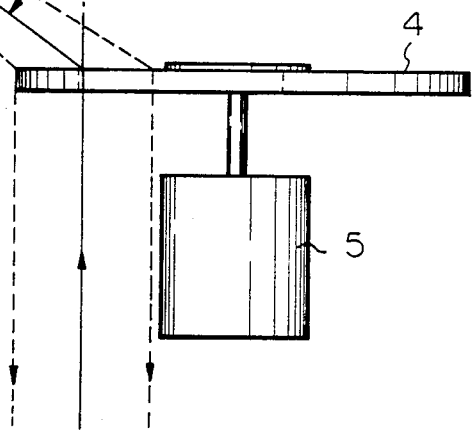
FIG. 2 is a side view of a hologram disc in accordance with the prior art.
Figure 3:
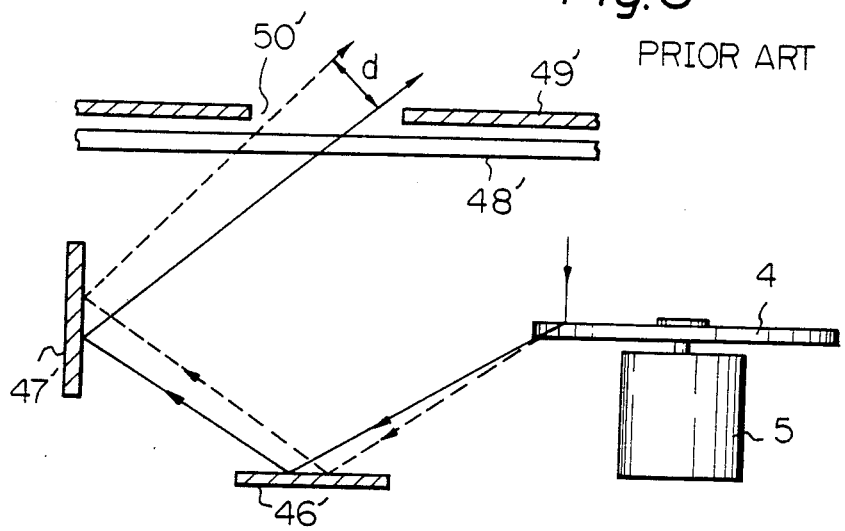
FIG. 3 is an explanatory view of the scanning beam in accordance with the prior art.
Figure 14:
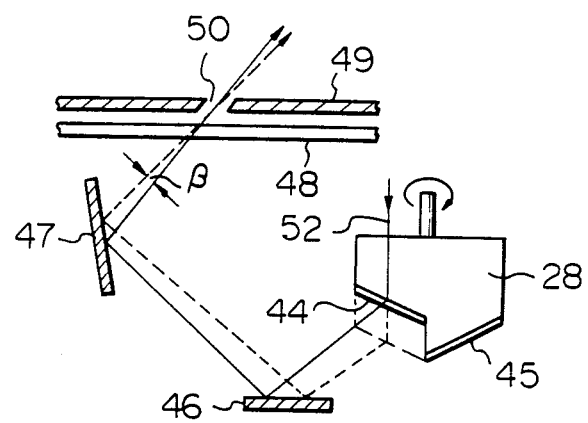
FIGS. 14 to 35 indicate the construction of different embodiments of the present invention, respectively.

In the example of FIG. 14, the incidence point of the laser beam 52 on each of the hologram facets 44 and 45 is changed by disposing each of the hologram facets 44 and 45 on a different level. The laser beam which passes through the hologram facet 44 is reflected by mirrors 46 and 47, passes through the glass plate 48 and the window 50 of the cover 49, and scans the object (not shown) above the cover as illustrated by the solid line in the figure. On the other hand, the laser beam which passes through the hologram facet 45 passes in a direction as illustrated by the dashed line, and is emitted through the same window 50. The level of each of the hologram facets 44 and 45 and the position of the mirrors 46 and 47 are determined so that the two beam passages (solid line and dashed line) intersect each other around the window 50. The intersection angle $\beta$ is arranged to be more than 1.45 degrees ($5 \times 10^{-4}$ Sr), which is prescribed as a necessary minimum angle (solid angle) for deeming that two intersecting lines of a beam are individual, in the laser safety standards of the IEC (International Electrotechnical Commission). These two beams scan in the same direction continuously one after the other on the same objective as two individual scanning beams. Therefore, the allowable strength of each beam in accordance with the safety standards can be strengthened, which upgrades the reliability of the scanning and reading. Also, the two beams intersect around the window of the cover plate so that the width of the window 50 can be narrowed, when compared with the prior art of FIG. 3, and thereby the glass plate 48 is effectively protected by the cover plate 49.

Figure 15:
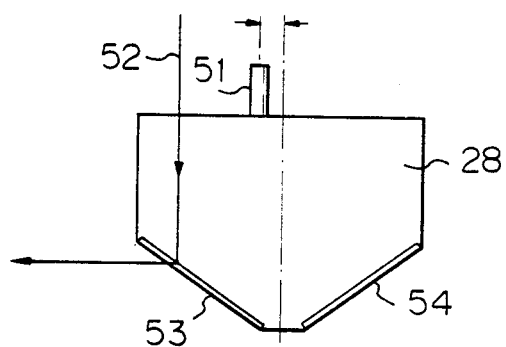

In the example of FIG. 15, the rotational shaft 51 of the rotary body 28 is eccentrically arranged with respect to the center axis of the rotary body 28, so that the incidence point of the laser beam 52 on the hologram facet 54 is shifted from that on the hologram facet 53.

Figure 16:
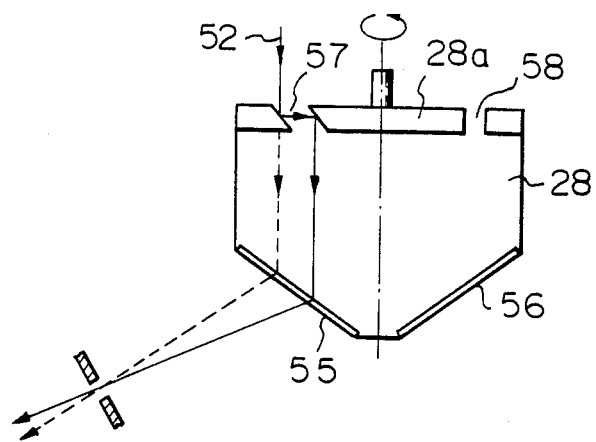

In the example of FIG. 16, a reflection slit 57 having inclined side mirror walls and a penetration slit 58 having vertical side walls are formed in the upper plate 28a of the rotary body 28. In this arrangement, the passage of the laser beam 52 is separated into two different passages after passing through the upper plate 28a, one being the passage of the beam passed through the reflection slit 57 (solid line), and the other being the passage of the beam passed through the penetration slit 58 (dashed line), thereby changing the incidence point of the beam on the hologram facet 55 from that on the hologram facet 56.

Figure 17:
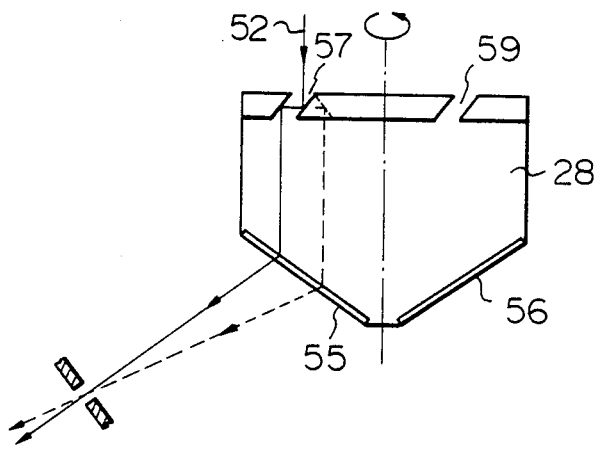

In the example of FIG. 17, instead of the penetration slit 58 of FIG. 16, another reflection slit 59, which has inclined side mirror walls inclined in reverse to the mirror of the slit 57, to reflect the beam in the direction reverse to the reflection direction of the slit 57 is formed in the upper plate 28a of the rotary body 28.

Figure 18:
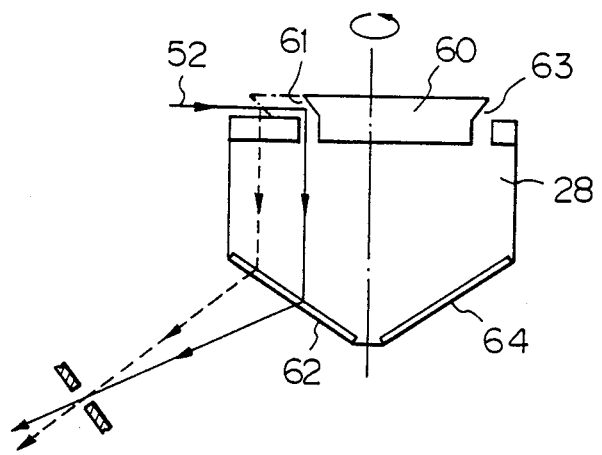

In the example of FIG. 18, the mirrors 61 and 63 are eccentrically provided on the upper plate 60 to separate the passage of the beam 52 into two passages, one being the passage of the solid line passing through the hologram facet 62 and the other being the passage of the dashed line passing through the hologram facet 64.

Figure 19:
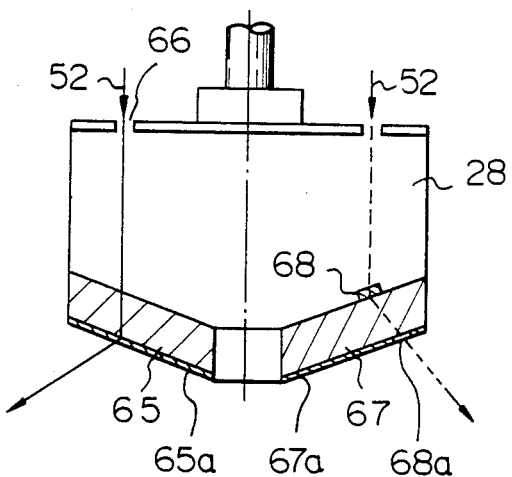

In the example of FIG. 19, hologram facets 65a and 67a are formed on the lower surface of thick transparent plates 65 and 67, respectively. A hologram piece 68 is formed on the upper surface of one of the plates 67 and a window 68a is formed in the lower hologram facet 67a corresponding to the upper hologram piece 68 so as to pass the beam diffracted by the upper hologram piece 68. The passage of the beam 52 passing through the same inlet 66 is differentiated after passing through the thick plate 65 or 67. The rotary body 28 of FIG. 19 is substantially symmetric in weight with respect to the rotational shaft, which results in a smooth rotational movement, compared with the examples of FIGS. 14, 15, and 18.

Figure 20:
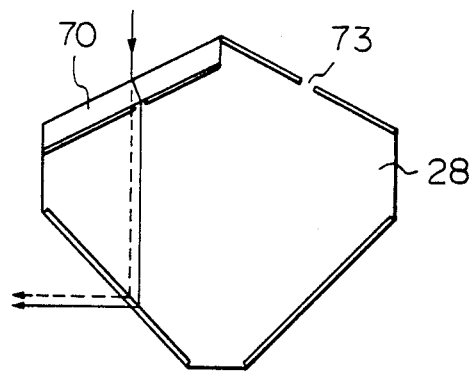

In the example of FIG. 20, the upper members of the rotary body 28 are inclined. A refractive member 70 is disposed above one of the hologram facets. The other upper plate member disposed above the other hologram facet has a through-hole 73 for passing through the laser beam. The laser beam which passes through the refractive member 70 is refracted as illustrated with the solid line, while the laser beam which passes through the through-hole 73 of the other upper plate passes straight through as illustrated with the dashed line.

Figure 21:
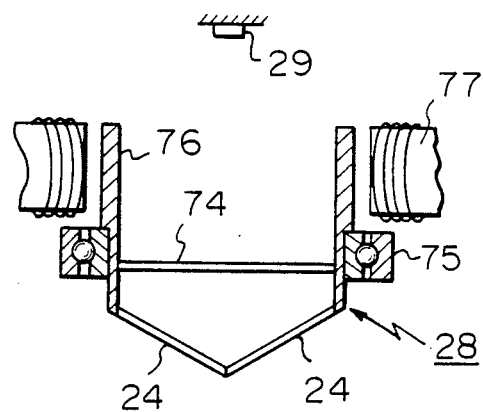
Figure 22:
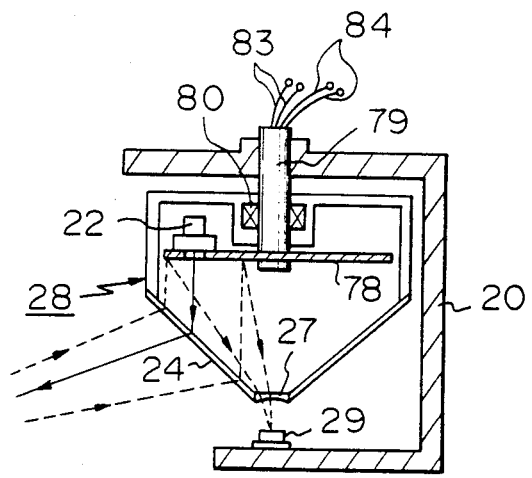
Figure 23:
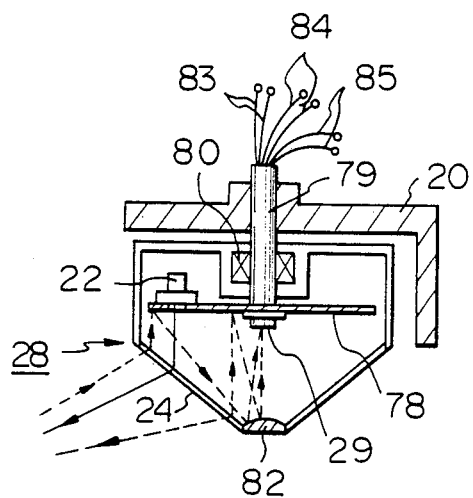

Variations of an embodiment of the present invention are illustrated in FIGS. 21 to 23. These embodiments are featured in that they comprise an improved means for driving the rotary body, which makes it possible to obtain a more compact hologram scanner.

In the example of FIG. 21, the cylinder portion 76 of the rotary body 28 is rotatably supported by a bearing means 75. A plurality of electromagnet coils 77 are disposed around the cylinder portion 76, so that the rotary body 28 itself constitutes a motor, in which the cylindrical portion 76 constitutes a rotor of the motor and the coils 77 constitute a stator of the motor.

In the example of FIG. 22, a hollow shaft 79 is secured to the frame 20. The rotary body 28 is rotatably attached to the hollow shaft 79. The hollow shaft 79 has a coil 80 inside of the rotary body 28, so that a motor is formed in which the rotary body 28 constitutes a rotor and the hollow shaft 79 constitutes a stator of the motor. A support plate 78 is secured to the hollow shaft 79. A Fresnel mirror (not shown) is disposed on the under side of the support plate 78. A laser diode module 22 is mounted on the support plate 78. Electric lines 83 connected to the laser diode module 22 and electric lines 84 connected to the coil 80 of the stator are disposed within the hollow shaft 79.

In the example of FIG. 23, the optical detector 29 is disposed within the rotary body 28 so as to make the scanner even more compact than the example of FIG. 22. The optical detector 29 is secured to the end of the hollow shaft 79 and a mirror 82 for converging the scattered light is disposed at the end of the rotary body 28. Electric lines 85 connected to the optical detector 29 are further disposed within the hollow shaft 79. The other components are substantially the same as those of FIG. 22.

Figure 24:
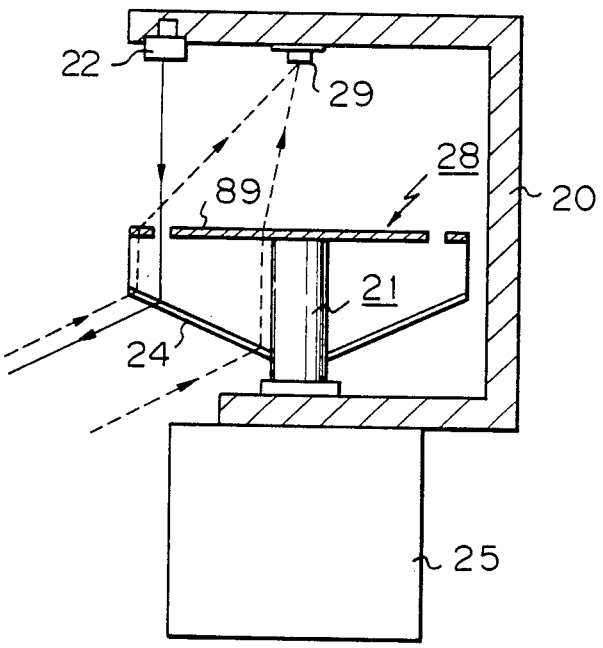

Another embodiment of the present invention is illustrated in FIG. 24. In this example, a motor shaft 21 penetrates the inside of the rotary body 28 along the entire length thereof. With this arrangement, the rotary body 28 is firmly secured to the motor shaft 21 so that the rotary body 28 rotates smoothly without generating vibration. Numeral 89 designates a transparent Fresnel lens.

Figure 25:
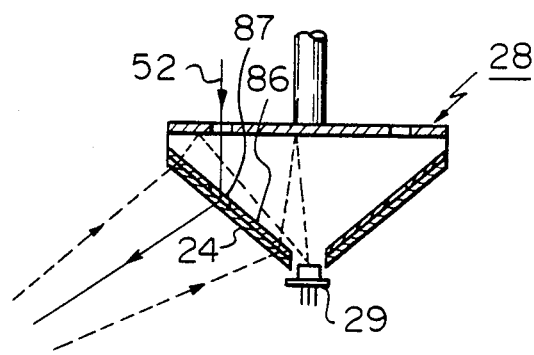
Figure 26:
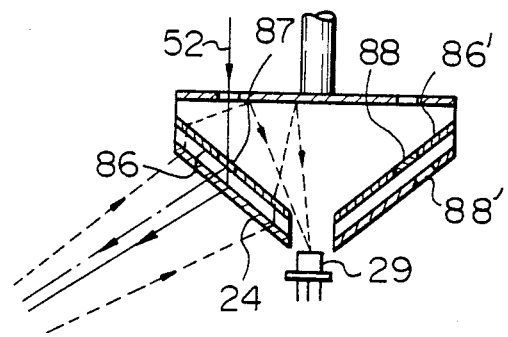

Further variations of the embodiment of the present invention are illustrated in FIGS. 25 and 26. These examples are featured in that they comprise a means for condensing the scattered light behind the hologram facet so as to shorten the rotary body in height.

In the example of FIG. 25, a condensing optical element 86, such as a Fresnel lens or hologram, is disposed behind each hologram facet 24. The scanning laser beam (solid line) passes through a window 87 of the optical element 86 and is diffracted by the hologram facet 24. The scattered light (dashed line) is received and diffracted by the hologram facet 24 and condensed by the optical element 86, is then reflected by the Fresnel mirror (not shown) disposed on the lower side of the upper plate of the rotary body 28, and then converges to the position of the optical detector 29.

In the example of FIG. 26, the window 87 of one of the optical elements 86′ is filled with a deviation means 88 such as a hologram. A window 88′ for passing the beam diffracted by the deviation means is formed in the hologram facet disposed below the optical element 86′. With such an arrangement, the passage of the laser beam 52 is separated into two passages (solid line and dash-dot line) in a manner similar to that of FIG. 19, and the scattered light is condensed by each of the optical elements 86, 86′ in the manner similar to that of FIG. 25.

Further variations of the embodiment of the present invention are illustrated in FIGS. 27 to 30. These examples are featured in that the laser beam is introduced into the rotary body through a portion other than the upper plate thereof. With such an arrangement, the motor for driving the rotary body can be disposed close to the upper plate of the rotary body, since the laser source and the mirror can be removed from the gap between the motor and the rotary body, so that the scanner becomes more compact and the rotary body rotates smoothly and stably at a high speed.

Figure 27:
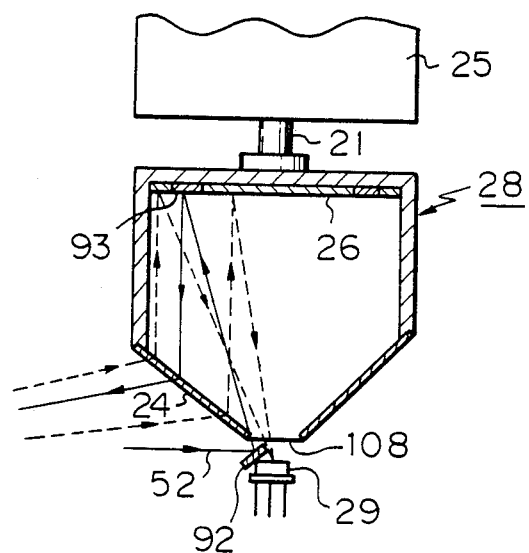

In the example of FIG. 27, the laser beam 52 is reflected by a mirror 92 disposed at the proximity of the lower end of the rotary body 28 and introduced into the rotary body 28 through an opening 108 at the lower end thereof. The introduced laser beam is reflected by a mirror 93 disposed annularly in the Fresnel mirror 26 and diffracted by the hologram facet 24.

Figure 28:
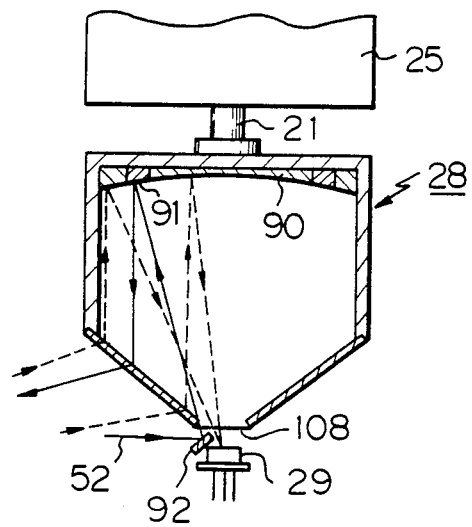

In the example of FIG. 28, an annular paraboloidal mirror 91 is disposed in a paraboloidal mirror 90 for converging the scattered light, instead of the annular mirror 93 disposed in the Fresnel mirror 26 of FIG. 27. The laser beam 52 is introduced into the rotary body 28 and emitted therefrom in a manner similar to that of FIG. 27. The focus of the paraboloidal mirror 90 is on the optical detecter 29 disposed on the rotational axis of the rotary body 28. The focus of the annular paraboloidal mirror 91 is at the intersection point of the rotational axis of the rotary body 28 with the passage of the incidence beam to this mirror 91.

Figure 29:
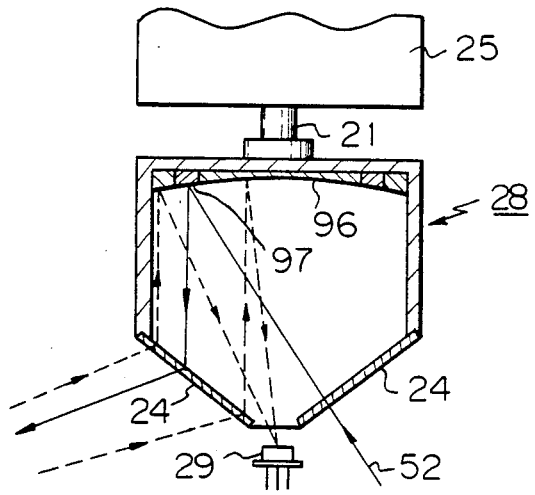

In the example of FIG. 29, the laser beam 52 is introduced into the rotary body 28 through the hologram facet 24. The laser beam 52 is irradiated on the hologram facet 24 at an incidence angle far from the Bragg angle so that a great part of the beam penetrates straight through the hologram without being diffracted. Paraboloidal mirrors 96, 97 are disposed on the lower side of the upper plate of the rotary body 28, in the same manner as that of FIG. 28.

Figure 30:
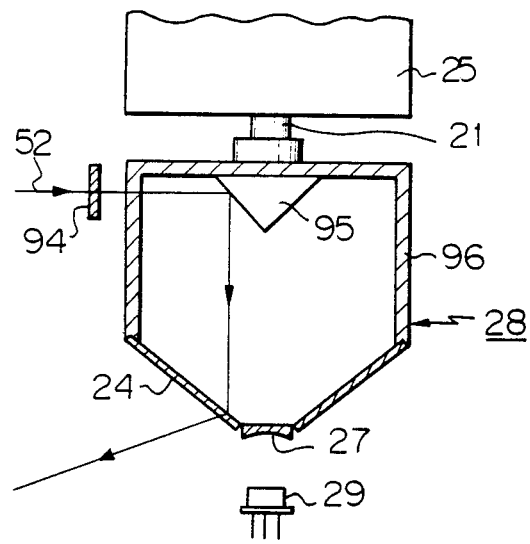

In the example of FIG. 30, the laser beam 52 is introduced into the rotary body 28 through its cylindrical side wall 96, which is made of a transparent material. Numeral 94 designates a cylindrical lens. The laser beam 52 is reflected by a conical mirror 95 disposed at the center of the lower side of the upper plate of the rotary body 28, and diffracted by the hologram facet 24. A Fresnel mirror (not shown) is also disposed on the lower side of the upper plate of the rotary body 28.

Figure 31:
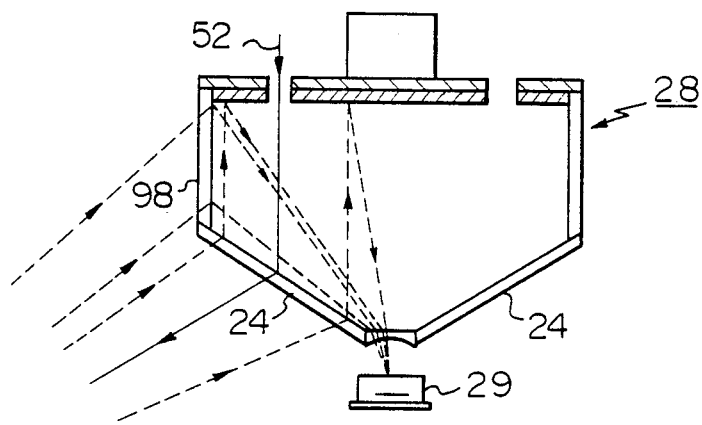

A further embodiment of the present invention is illustrated in FIG. 31. In this example, the side wall 98 of the rotary body 28 is formed as a hologram facet. The scattered light from the objective is received by the hologram of the side wall 98 and diffracted toward the lower end of the rotary body 28 where the optical detector 29 is disposed. With such a construction, the amount of the scattered light received by the hologram facet is increased, which upgrades the detection reliability. The side wall 98 is a cylindrical wall or a plate constituting a polygon pillar. The hologram of the side wall 98 is constructed by using a spherical wave diverging from the scanning point of the objective as the object beam and a spherical wave converging toward the central lower end of the rotary body as the reference beam.

Figure 32:
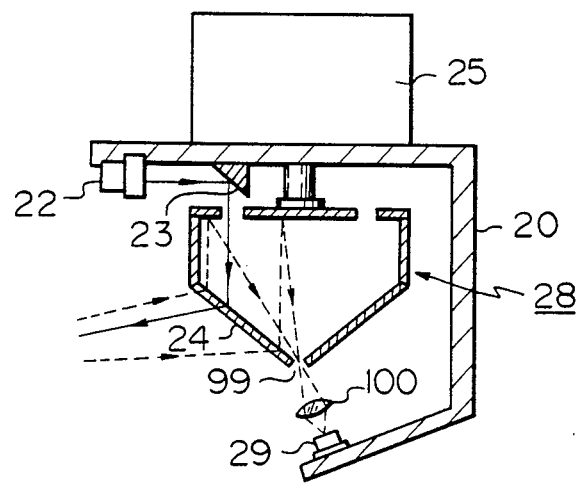

A further embodiment of the present invention is illustrated in FIG. 32. In this example, the opening 99 at the lower end of the rotary body 28 is very small and the scattered light (dashed line) is converged to this opening 99. The scattered light diverges from the converged point at the opening 99 and again converges through a convex lens 100 disposed outside of the rotary body 28 so that the converged beam is detected by the optical detector 29. A hologram or an ellipse mirror may be used for converging and deviating the scattered beam to a desired position, instead of the convex lens 100.

Figure 33:
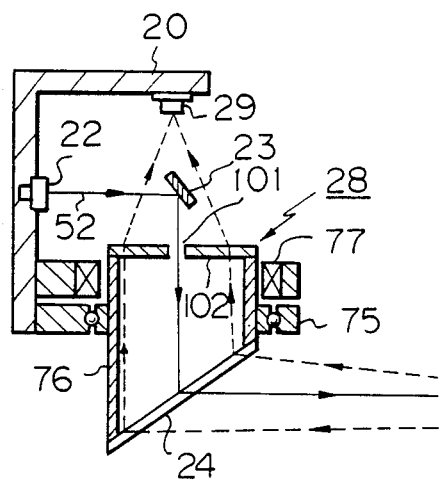
Figure 34:
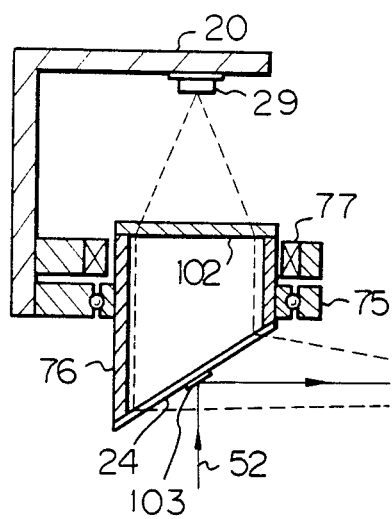

Further embodiments of the present invention are illustrated in FIGS. 33 and 34. In these examples, one inclined hologram facet 24 is disposed on the lower side of the rotary body 28, for instance at 45°.

In the example of FIG. 33, a cylinder 76 of the rotary body 28 is rotatably supported by the frame 20 through a bearing means 75. The rotary body 28 itself constitutes a motor in which the cylinder 76 serves a rotor and coils 77 disposed around the cylinder 76 serve as a stator, similar to the example of FIG. 21. Instead of such an arrangement for constituting a motor, a motor may be used for driving the rotary body through a reduction gear means. A hole 101 for passing the laser beam is formed at the center of the upper plate of the rotary body 28. The laser beam 52 from the laser diode module 22 is reflected by the mirror 23, and introduced into the rotary body 28 through the hole 101, and then is diffracted by the hologram facet 24 to scan an objective. The scattered light from the objective is received by the hologram facet 24. With this construction, the area of the hologram facet for receiving the scattered light is enlarged.

In the example of FIG. 34, the difference from the example of FIG. 33 resides in that the laser beam 52 is irradiated into the rotary body 28 from the lower side thereof. A mirror 103 is coated at the center of the lower surface of the hologram facet 24. In both examples of FIGS. 33 and 34, the hologram facet 24 is constructed so that the spherical scattered light is changed to a plane wave light and the upper plate 102 of the rotary body 28 comprises a transparent Fresnel lens for converging the parallel plane wave scattered light diffracted by the hologram facet 24. However, instead of such an arrangement, a self-focusing hologram facet and a mere transparent upper plate may be used, so that the scattered beam is directly converged to the position of the optical detector 29 by the self-focusing hologram facet.

Figure 35:
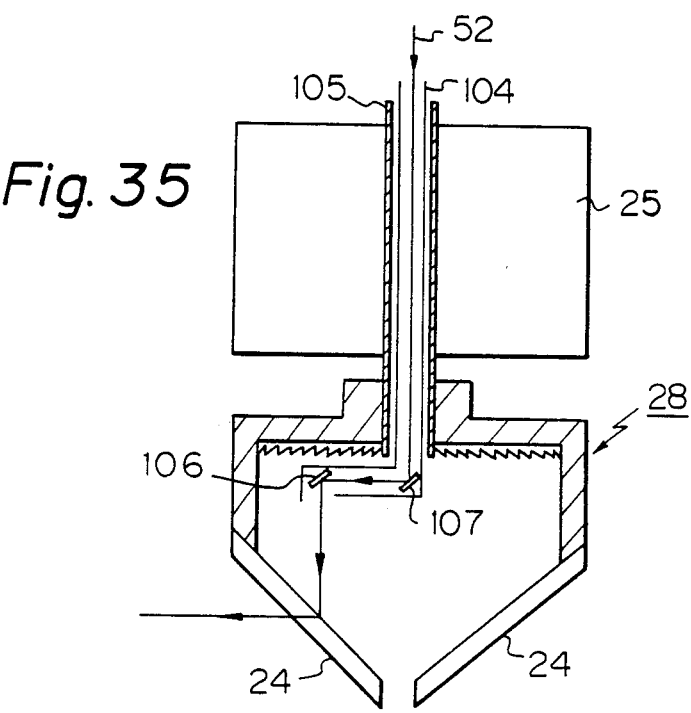

A further embodiment of the present invention is illustrated in FIG. 35. In this example, the laser beam 52 is introduced into the rotary body 28 through a hollow rotational shaft 105. An L-shaped pipe 104 is installed within the hollow rotational shaft 105. Two mirrors 106 and 107 for reflecting and deviating the laser beam 52 are disposed in the L-shaped pipe 104. The hollow shaft 105 may be either integral with the shaft of the motor 25 or connected to the motor shaft through a reduction gear means. The L-shaped pipe 104 in the hollow shaft does not rotate.

In the above mentioned embodiments of the present invention, the hologram may be formed either directly on the rotary body member or on a plate which is attached to the rotary body, to constitute a hologram facet of rotary body.

We claim:

1. A hologram scanner comprising:
   a laser source for providing a laser beam;
   a rotary body having a rotational axis;
   at least one hologram facet arranged on said rotary body for diffracting said laser beam and for receiving and diffracting the scattered light from said object, said hologram facet being inclined with respect to said rotational axis of said rotary body;
   motor means for driving said rotary body; and
   an optical detector for detecting the scattered light received and diffracted by said hologram facet,
   wherein said rotary body comprises means for converging said scattered light incoming through said hologram facet to lead the light to said optical detector.

2. A hologram scanner according to claim 1, comprising two of said hologram facets, said rotary body being cylindrical, wherein a wedge shaped portion is formed by said two hologram facets at an end of said cylindrical rotary body.

3. A hologram scanner according to claim 1, comprising at least three of said hologram facets, said rotary body comprising a cylinder, wherein said at least three hologram facts form a pyramid at an end of said cylinder.

4. A hologram scanner according to claim 1, comprising at least three of said hologram facets, said rotary body comprising a polygonal pillar, wherein said at least three hologram facets form a pyramid at an end of said polygonal pillar.

5. A hologram scanner according to any one of claims 1 to 4, wherein the laser beam is introduced into said rotary body through an opening at an end of said rotary body, reflected within said rotary body, and emitted therefrom through said each hologram facet.

6. A hologram scanner according to any one of claims 2 to 4, wherein the laser beam is introduced into said rotary body successively through each said hologram facet, penetrates straight therethrough, is reflected within said rotary body and emitted therefrom through a different hologram facet, as a result of being diffracted by said different hologram facet.

7. A hologram scanner according to any one of claims 1 to 4, wherein the laser beam is introduced into said rotary body through a side wall thereof, reflected within said rotary body, and emitted therefrom through each said hologram facet.

8. A hologram scanner according to any one of claims 1 to 4, wherein the laser beam passes through a hollow shaft of the rotary body.

9. A hologram scanner according to any one of claims 1 to 4, wherein the laser beam is emitted from the rotary body in the direction perpendicular to the rotational axis thereof.

10. A hologram scanner according to claim 1, said rotary body comprising a cylindrical body, wherein only said one inclined hologram facet is disposed at an end of said cylindrical body.

11. A hologram scanner according to any one of claims 1 to 4 or 10, wherein said at least one hologram facet comprises at least two hologram facet elements having different diffraction directions.

12. A hologram scanner according to any one of claims 1 to 4 or 10, wherein the Bragg plane of the hologram of each said hologram facet is perpendicular to the respective surface thereof.

13. A hologram scanner according to any one of claims 1 to 4 or 10, wherein said rotary body comprises means for changing the location of the incidence point of the laser beam on said at least one hologram facet, with respect to an axis of rotation of said rotary body, during each rotation of said rotary body.

14. A hologram scanner according to any one of claims 1 to 4 or 10, wherein said rotary body constitutes a rotor of said motor means.

15. A hologram scanner according to claim 14, wherein said rotary body is rotatably attached to a hollow shaft which constitutes a stator of said motor means, and electric lines are disposed through said hollow shaft.

16. A hologram scanner according to any one of claims 1 to 4 or 10, wherein the rotary shaft of said rotary body is disposed within the inside of said rotary body along the full length thereof.

17. A hologram scanner according to any one of claims 1 to 4 or 10, wherein optical means for condensing the scattered light is disposed behind said at least one hologram facet.

18. A hologram scanner according to any one of claims 1 to 4 or 10, wherein a hologram for condensing the scattered light is formed on a side wall of said rotary body.

19. A hologram scanner according to any one of claims 1 to 4 or 10, wherein the scattered light has a converging point at an opening at an end of said rotary body.

20. A hologram scanner according to any one of claims 1 to 4 or 10, wherein the motor means, the rotary body, the laser source, and the optical detector are mounted on one common frame so as to constitute one scanning module.

21. A hologram scanner according to claim 20, wherein said scanning module is installed in a bar-code reader.

22. A hologram scanner according to any one of claims 1 to 4 or 10, wherein the inclination angle of said at least one hologram facet is 45 degrees.

23. A hologram scanner according to claim 10, wherein said one hologram facet diffracts said scattered light so as to focus it on said optical detector.

24. A hologram scanner according to claim 1, wherein said at least one hologram facet converts said scattered light from a spherical wave to a plane wave, and said hologram scanner includes a hologram that is oriented perpendicularly to the axis of the rotary body for focusing said plane wave onto said optical detector.

* * * * *

UNITED STATES PATENT AND TRADEMARK OFFICE
CERTIFICATE OF CORRECTION

PATENT NO. : 4,655,541

DATED : April 7, 1987

INVENTOR(S) : Kozo Yamazaki, Fumio Yamagishi, Hiroyuki Ikeda, Takefumi Inagaki, Ichiro Sabata, Shunji Kitagawa, Masayuki Kato, Toshiyuki Ichikawa It is certified that error appears in the above-identified patent and that said Letters Patent is hereby corrected as shown below:

On the Title Page:

[73] "Kanagawa" should be --Kawasaki--.

[57] line 2, "axis" should be --axis,--.

Column 1, line 33, "9;" should be --9,--.

Column 9, line 37, "facts" should be --facets--;
line 65, after "4" insert --or 10--.

Signed and Sealed this

Twenty-fifth Day of August, 1987

Attest:

DONALD J. QUIGG

Attesting Officer

Commissioner of Patents and Trademarks